MATERIAL HANDLING DEVICE FOR INDUSTRIAL TRUCKS

Original Filed June 11, 1948 4 Sheets-Sheet 1

INVENTOR.
LESLIE G. EHMANN

BY Cook and Ackermerhorn

ATTORNEYS

MATERIAL HANDLING DEVICE FOR INDUSTRIAL TRUCKS

Original Filed June 11, 1948 4 Sheets-Sheet 2

INVENTOR.
LESLIE G. EHMANN.
BY Cook and Schermerhorn
ATTORNEYS

MATERIAL HANDLING DEVICE FOR INDUSTRIAL TRUCKS

Original Filed June 11, 1948 4 Sheets-Sheet 3

INVENTOR.
LESLIE G. EHMANN

BY Cook and Schermerhorn

ATTORNEYS

MATERIAL HANDLING DEVICE FOR INDUSTRIAL TRUCKS

Original Filed June 11, 1948 4 Sheets-Sheet 4

INVENTOR.
LESLIE G. EHMANN

BY Cook and Ackermerhorn

ATTORNEYS

Reissued Aug. 4, 1953

Re. 23,694

UNITED STATES PATENT OFFICE 23,694

MATERIAL HANDLING DEVICE FOR INDUSTRIAL TRUCKS

Leslie G. Ehmann, Portland, Oreg., assignor to Hyster Company, Portland, Oreg., a corporation of Oregon Original No. 2,571,550, dated October 16, 1951, Serial No. 32,429, June 11, 1948. Application for reissue September 13, 1952, Serial No. 309,571

20 Claims. (Cl. 214—653)

Matter enclosed in heavy brackets [ ] appears in the original patent but forms no part of this reissue specification; matter printed in italics indicates the additions made by reissue.

This invention relates to material handling devices of the type having power operated means for picking up and carrying a load.

This type of material and load handling mechanism is utilized to especial advantage on a class of vehicles known as industrial lift trucks, although it is not necessarily limited to the conventional forms of such trucks. Conventional lift trucks are extensively used for handling and moving different kinds of materials and objects in industrial plants and warehouses and the like. Such lift trucks are usually provided with a pair of forwardly extending forks or arms for lifting a load and carrying it in front of the vehicle. To avoid manual handling as much as possible, the materials or packages ordinarily must be piled on low platforms called pallets having space for the arms of the lift truck to extend therebeneath to lift the load. Conventional lift trucks cannot pick up a load which is resting flat on the floor, nor can they pick up the top part of a stack of articles such as boxes, cartons or barrels without the use of pallets or their equivalents in the stacks to allow space for entrance of the lift truck arms. Thus a very large number of pallets have heretofore been required for the handling of material by lift truck, which entails a considerable expense. The use of pallets is also wasteful of space, and, furthermore, articles such as bales and packages with rounded or bulging ends and sides will not rest securely either individually or in tiers to be carried on pallets. Another shortcoming of conventional lift trucks is that they merely lift, and therefore cannot pull a selected object such as a bale of cotton or steel drum of oil from a group of closely packed bales or drums on a warehouse floor or the like.

Accessory equipment has heretofore been proposed for lift trucks and the like to lift a load by clamping the load on its sides instead of supporting it underneath, but such equipment as has been presented to the trade has not been generally adopted because of numerous shortcomings and limitations. An outstanding objection to previous equipment for this purpose is that the travel of the load engaging arms has been so limited that the equipment could be used for only a limited range of sizes of packages or articles. he adjustments necessary to grip loads of different width have heretofore required the services of a mechanic and have necessitated taking the equipment out of service temporarily. Moreover, the movement of the linkage and pistons has been of such nature that the equipment heretofore proposed has not had satisfactory rigidity and load capacity when spread apart to extreme limits where the equipment was also capable of handling narrow loads.

The front overhang of the arm clamping mechanism has also been a serious handicap in prior devices. Such objectionable overhang has been largely unavoidable heretofore because of the inherent nature of the apparatus employed with the result that the pay load of the vehicle is reduced. For example, a lift truck which is rated as a one-ton truck is supposed to be able to carry two thousand pounds fifteen inches in front of its upright lifting frame. If the mechanism for operating the clamping arms takes up a part of this fifteen inch space, the center of gravity of the load is thereby necessarily moved forward which has the practical result of reducing the load rating of the truck.

The use of pivotally mounted load clamping arms in prior devices has also been found to be of disadvantage. When the arms are arranged to reach out to a wide spread and also to retract to engage a narrow load they have considerable vertical movement in addition to their lateral movements. Such arms may be brought near the ground for a low grip on a narrow load but they are ordinarily well above the ground when they are spread out, making it necessary to obtain a high grip on a wide load. Angular movement of the arms is further objectionable because of the varying angular positions of the hydraulic cylinders and operating pistons which reduce the effective clamping effort which may be exerted on a load in certain positions of the arms. In constructions of this type heretofore proposed, the least clamping force is obtainable when the arms are spread the widest as they are likely to be in carrying an unusually large and heavy load.

Another objection to previous load clamping mechanisms is that they have been of too great vertical height. When loading to the ceiling in a box car or other low ceiling place, the mechanism frequently strikes the ceiling before the load is lifted into place.

Objects of the present invention are to provide an improved load handling mechanism to dispense with the use of pallets, to provide a handling mechanism for stacking heavy and bulky objects compactly and for removing compactly stacked objects without manual assistance, to provide an improved load lifting mechanism having a pair of arms adapted to grasp an object by its sides without furnishing bottom support under the object, to provide novel means for clamping the lifting arms together with sufficient force to grip and lift a heavy object, or to lift and transport a tier of objects by merely embracing the sides of the lowermost object by the lifting arms, and to provide novel forms of detachable and interchangeable lifting arms for handling and manipulating different kinds of materials.

Still other objects are to provide a mechanism of the type described which may be manufactured as an attachment for lift trucks which will overcome the above mentioned shortcomings of prior devices of this type, to provide a very compact mechanism projecting out not more than a few inches in front of the uprights of the lift truck and having a low over-all height so that loads may be lifted up close to a ceiling at any height, and to provide a wide range of movement in the mechanism from a very narrow grip to an exceedingly wide grip without loss of rigidity and clamping force in any position of the arms and without having a base unit for the attachment wider than the truck. Other objects are to eliminate pivot points and pivoted arms, to provide a mechanism capable of movement to its extreme minimum or maximum width positions by merely operating a valve control and without making any mechanical adjustment of the parts, and to provide a mechanism having a load arm movement parallel to the ground throughout its range of movement.

The illustrated embodiment of the present device constitutes a novel and improved form of load carriage, or attachment for a load carriage, for an industrial lift truck or other apparatus having some form of elevating and transporting means. Instead of carrying the load on fixed arms extending under a pallet, the present load carriage is provided with forwardly extending arms which may be drawn together laterally in horizontal movement parallel with the ground to grip or clamp the sides of the article to be lifted or the sides of the bottom article of a tier where the whole tier is to be moved at once. The arms are thus drawn together with sufficient force for the purpose by a pair of hydraulic cylinders mounted on the carriage. When the present mechanism is used on a lift truck or similar vehicle, the movements of the arms are controlled by a simple valve lever accessible to the driver and adjacent the other control levers for raising and lowering the load carriage and operating the vehicle. As the description proceeds, it will be apparent that the present mechanism eliminates the need for pallets and enables objects to be handled individually and in stacks with greater facility than the conventional lift truck.

With the foregoing and other objects in view, the invention further resides in the details of construction and arrangement of parts illustrated in the preferred embodiments shown on the accompanying drawings. It is to be understood, however, that the present embodiment is shown for purposes of illustration only and not for the purpose of limiting the invention, as various changes will occur to persons skilled in the art, and all such modifications within the scope of the appended claims are included in the invention.

Figure 10:
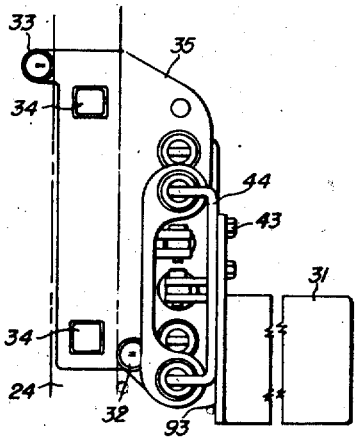
Figure 9:
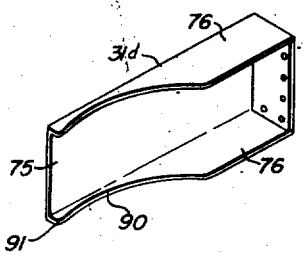
Figures 5, 6, 7, 8:
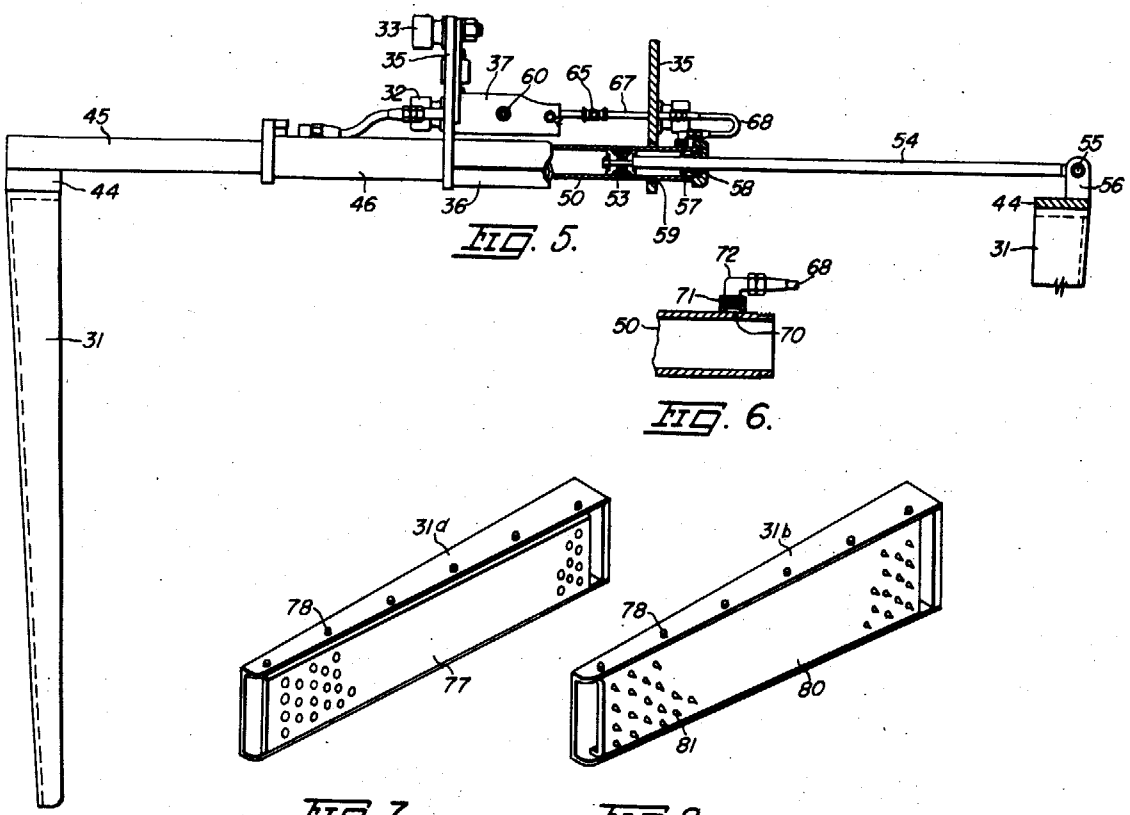
Figure 5 is a top plan and sectional view of the load carriage, taken on the line 5—5 of Figure 2.
Figure 6 is an enlarged fragmentary view showing a metering orifice in one of the horizontal cylinders on the load carriage.
Figure 12:
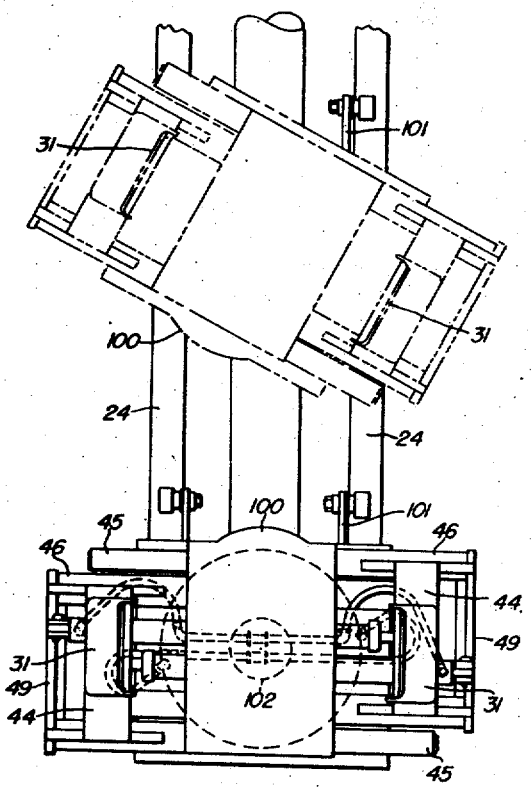
Figure 13:
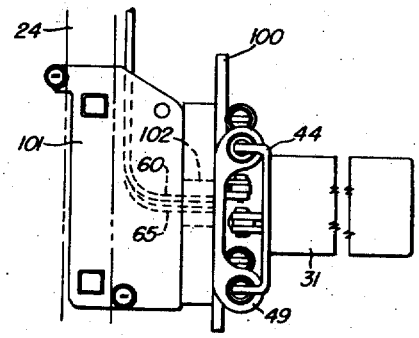
Figure 11:
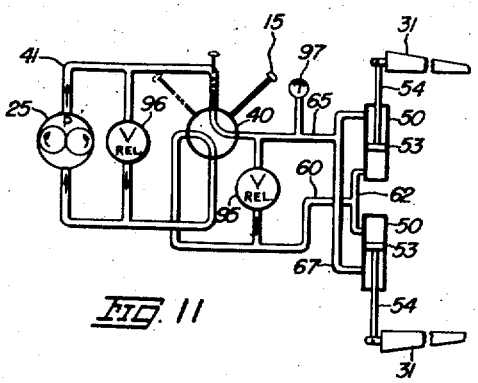

Figures 7 to 9, inclusive, are perspective views of different forms of load carrying arms for the load carriage;

Figure 10 is a side elevation view of a modification having arms adapted to grasp an object close to the floor;

Figure 11 is a schematic view of the hydraulic system for extending and retracting the load carrying arms;

Figure 12 is a front elevation view of a modification wherein the clamping arms and their actuating mechanism are mounted on a rotatable member on the lift carriage, the parts being shown in different positions in full and broken lines;

Figure 13 is a side elevation view of the structure of Figure 12; and

Figure 14:
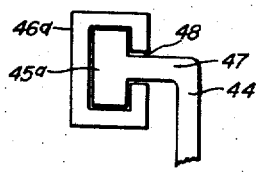

Figure 14 is a fragmentary view showing another form of horizontal guide and support structure for the clamping arms.

Figure 1:
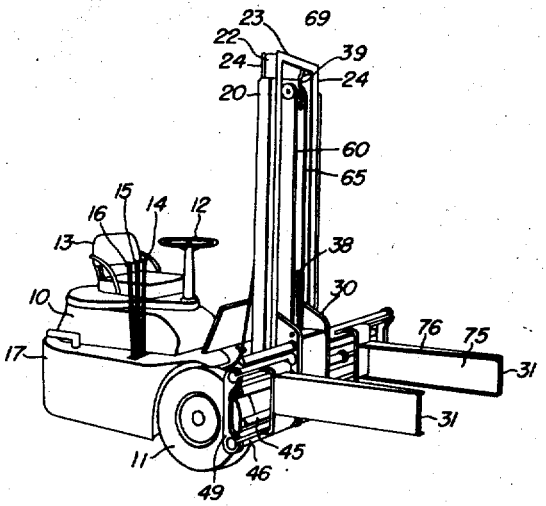
Figure 1 is a perspective view of a lift truck showing the present material handling device installed thereon.

In Figure 1 the invention is illustrated in connection with a lift truck 10 having a pair of engine driven front wheels 11 and a single rear wheel, not shown, which is steerable by the usual hand wheel 12. The numeral 13 designates the driver's seat which is accessible to the necessary controls for driving the vehicle, and also to levers 14, 15 and 16 for controlling the load handling mechanism. In this type of truck, the load is carried entirely in front of the front wheels 11, and so the rear end 17 of the vehicle is usually equipped with a heavy counterweight in addition to the weight of the engine to hold the rear end of the vehicle down.

Such lift trucks are further equipped with an upright frame 20 on the front of the truck to guide a lift frame 22. The lift frame 22 has a top horizontal cross member 23 and a pair of vertical members 24 mounted for vertical sliding movement in the upright frame 20. The lift frame 22 may be raised by various means, such as a vertical hydraulic cylinder having a piston with a piston rod extending upwardly to support the top cross member 23. Lift trucks of this type are equipped with a hydraulic pump 25 (Figure 11) for operating various hydraulic instrumentalities such as the vertical cylinder for the lift frame 22 and a cylinder for tilting the upright frame 20. The lift cylinder is controlled by a valve lever such as the lever 14 in Figure 1. The mechanism of the present invention includes additional hydraulic cylinders which are intended to be supplied from the hydraulic pressure system of the vehicle. The general arrangement of parts thus far described comprises one form of lift truck to which the present load handling mechanism may be applied, but it is to be understood that the mechanism of the invention may also be applied to other types of trucks and apparatus not possessing these specific features.

The principal features of the present invention are embodied in the load *or lift* carriage 30, shown in Figures 2 to 5, having a pair of forwardly extending load engaging arms 31 which may be drawn together with a powerful force to grip the sides of an object for the purpose of lifting it off the floor without bottom support. The carriage 30 is provided with pairs of rollers 32, 33 and 34 to guide it for smooth vertical movement with a minimum of friction. These various rollers are mounted on a pair of vertical side plates 35 which comprise parts of the frame of carriage 30. The carriage frame also includes a front bumper guard plate 36 and cross member 37 extending between the side plates 35.

The carriage is supported by a link chain 38 which has one end secured to the cross member 37, and is trained over a sheave 39 in a sheave mounting on the upper cross member 23 of the lift frame 22, the chain having its other end anchored at the bottom of the upright frame 20. The above described arrangement is such that when hydraulic pressure is admitted to the lower end of the vertical lift cylinder (not shown), its piston is forced upwardly to elevate the lift frame 22 and sheave 39 to raise the carriage 30. The arrangement of the vertical cylinder for raising the lift frame 22 is not important to an understanding of the present invention, the only important requirement being that the carriage 30 is raised and lowered by some suitable power operated means.

Each arm 31 is detachably secured by bolts 43 (Figure 4) on a vertical cross head member 44 integrally interconnecting the outer ends of a pair of horizontal tubular slides 45. The slides 45 are supported for lateral sliding movement in a series of parallel horizontal tubular guides 46 whereby the integral parts 44 and 45 may be considered to constitute a slide for an arm 31. Each cross head member 44 stands out forwardly from the slides 45 on horizontal end portions 47 which are adapted to travel in slots 48 in the guide tubes 46 when the arms are retracted toward a central position. The guide tubes 46 may thus be made long enough to provide a wide support base for the load carrying arms in their widest extended position while still permitting the cross head and arms to be retracted close together to clamp small objects. Each guide tube 46 extends through aligned holes in the side plates 35 where it is welded to each of these plates and the outer ends of each pair of guides 46 are inter-connected by a spacing member or plate 49 which is welded to the guides to make the members 49 integral parts of the carriage 30. The ends of the guide tubes are left open for the ends of the slides 45 to project therethrough when the arms are retracted. The minimum spacing of the arms 31 to grip small objects is thereby not limited by the outside length of the guide tubes, which length is critical only to determine the minimum width of the apparatus for traveling down a narrow aisle without a load, as will be seen from Figure 3 where the parts are shown at minimum width and in almost the minimum gripping position. In the present embodiment it will be observed that the arms 31 may be retracted still further without changing the outside width of the apparatus. It will further be observed that the minimum spacing of the load carrying arms is not limited by the length of the slides since the opposed slides may freely pass each other in their individual guides.

Figure 3:
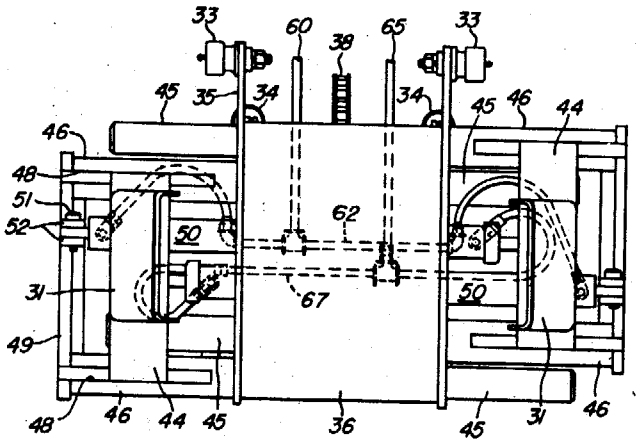
Figure 3 is a view similar to Figure 2 showing the load carrying arms in partially retracted position.
Figure 4:
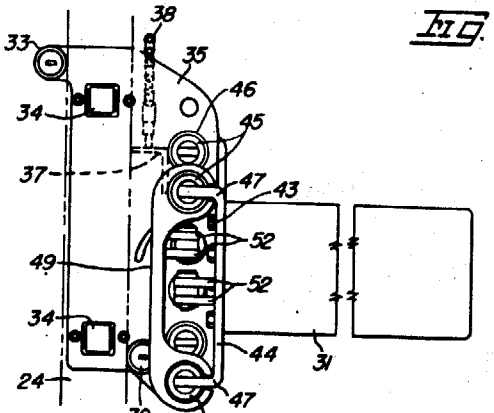
Figure 4 is a side elevation view of the load carriage.

The arms 31 are extended and retracted by hydraulic pressure in a pair of horizontal cylinders 50 extending in opposite directions. One end of each cylinder 50 is pivotally mounted on a pin 51 extending through ears 52 on one of the plates 49. Within each cylinder 50 is a piston 53 on a piston rod 54 whose outer end is pivotally connected with a pin 55 in a pair of ears 56 on one of the connecting members 44 carrying an arm 31. The piston rod 54 slides in a guide bearing 57 in the end of the cylinder in addition to the usual packing gland 58 to hold the piston rod in axial alignment within the cylinder without undue wear on the packing. Each cylinder and piston rod unit is thereby supported solely by the two pin connectors 51 and 55 to maintain true alignment and free movement of the piston and piston rod within the cylinder without the possibility of binding in any position of the parts. Any deflection of the structure under a heavy load will thereby not interfere with the free action of the pistons or produce excessive wear and friction in the moving parts. For this reason also, the vertical side plates 35 of the frame are provided with large holes 59 for the cylinders so that the cylinders will not engage these members. In retracted position the cross heads 44 clear and pass the outer ends of the cylinders 50 as shown in Figures 3 and 4.

The piston rods and load carrying arms 31 are extended by pumping hydraulic fluid into the inner ends of the two cylinders 50 through a flexible tube or conduit 60. The conduit 60 terminates in a T fitting 61 connected with branch pipes 62 and flexible conduits 63 leading to the inner ends of the cylinders adjacent their pin connectors 51. The piston rods and arms 31 are retracted by pumping hydraulic fluid through a flexible tube of conduit 65 into the outer ends of the two cylinders. The conduit 65 terminates in a T fitting 66 connected with a pair of branch pipes 67 and flexible conduits 68 leading to the outer ends of the cylinders adjacent the previously mentioned bearings 57 and packings 58. It is understood that when hydraulic fluid is pumped through one of the conduits 60 or 65 to extend or retract the arms 31, the movement of the pistons in the cylinders causes an equal return flow of hydraulic fluid through the other one of the conduits.

Fluid flow through the conduits 60 and 65 is controlled by the previously mentioned lever 15 connected with a three-position valve 40 in pressure line 41 of the oil pressure system used for raising and tilting the lift. The arrangement, as shown schematically in Figure 12, is such that when the lever 15 is moved in one direction hydraulic fluid is pumped under high pressure through the conduit 60 to the inner ends of the cylinders 50, while another portion of the hydraulic fluid in the system is returned from the outer ends of the cylinders through the conduit 65. When the lever 15 is moved in the opposite direction, the conduit 65 becomes the pressure line and the conduit 60 becomes the return line. The lever 15 has a rest position between the two extreme positions just mentioned, in which rest position the valve 40 closes both conduits 60 and 65 to hold the pistons rigidly in any desired positions in their cylinders. The hydraulic pump and pressure system are of course a part of the usual equipment of any lift truck having a hydraulic lift and the present invention is intended to be operated from such a system, although it may be adapted for operation by compressed air.

The flexible conduits 60 and 65 are trained over a pair of sheaves 69 on the shaft of the chain sheave 39 at the top of the lift frame 22 to accommodate vertical movements of the carriage 30 without producing slack in the conduits. The conduits thereby move with the chain 38.

It is desired to provide some means for metering the flow of hydraulic fluid into the two cylinders 50 to control the relative movements of the two pistons. In the present embodiment the fluid flow is metered into the two cylinders to tend to produce equal and opposite movement of the two arms 31 at all times. Figure 6 shows a novel and very simple form of metering device which causes the two pistons 53 to move substantially at the same rate, so that an object engaged between the arms 31 may be centered in front of the lift truck. It is possible with the present metering device to center rather large and heavy objects such as steel drums of oil by engaging such an object with only one of the arms 31 to slide it sidewise on the floor without substantially disturbing the symmetrical position of the two arms 31 with respect to the lift truck. The present metering device comprises a relatively small orifice 70 through the wall of the cylinder 50 to restrict the fluid flow into and out of the cylinder. The orifice 70 opens into the interior of a collar 71 welded to the outside of the cylinder and threaded to receive a fitting 72 on the end of one of the flexible conduits 63 or 68. It is understood that each end of each of the cylinders 50 is provided with an orifice 70 of the type described to meter the fluid flow to or from each of the four conduits 63 and 68. It is desirable to have the orifices 70 very small in comparison with the volumetric capacity of the oil pump in the oil pressure system of the lift truck, so that the desired working pressure will be maintained in the pressure lines at all times, regardless of the movement of the pistons. It will thus be apparent that if one of the arms 31 is engaged against a heavy object on the floor to move it sidewise while the other arm 31 encounters no resistance, the two arms will nevertheless move together substantially at the same rate because the maximum operating pressure is maintained on the working piston regardless of the movement of the idling piston.

The function of the orifices 70 may be explained more clearly by pointing out what would happen if these orifices were enlarged to form ports of conventional size to handle the flow of the conduits and pipe lines without substantial restriction. With conventional ports substituted for the orifices 60, the two arms 31 would not remain centered with respect to the load carriage 30 if only one of the arms were engaged with the load. In such case, the freely movable arm would move in quickly because substantially the entire output of the hydraulic pump would be directed into that cylinder having the relatively free piston. During this interval, the hydraulic pressure would drop to a very low value and very little force could be exerted by the other arm which was endeavoring to move the load. The result would be that the arm engaging the load would not move until the originally free arm had ceased to move and would then be either at its limit of movement or engaging the other side of the load, so that the load could not be centered without the use of valves in the four pipes 62 and 67. In the present system the orifices 70 produce a slow approximately uniform motion of the arms 31 at a rate which is substantially constant regardless of the resistance to such motion, within the limits of the fluid pressure system. It is not necessary that the orifices 70 be so fine that they slow up the movements of the arms to an extent which would be detrimental to the expeditious handling of materials, but merely to prevent the arms, or one of them, when free, from moving at a speed which would materially reduce the working pressure in the hydraulic system. If one of the arms 31 becomes extended or retracted more than the other, it is only necessary to extend or retract the arms momentarily to their limits of movement to place both arms in similar positions.

Different types of load carrying arms are shown for use with different kinds of materials and containers. The arms 31 shown in Figures 1 to 5, inclusive, comprise channel members having vertical web portions 75 with inwardly directed top and bottom horizontal flanges 76 extending from the web portions sufficiently to indent themselves into materials or containers to be lifted. The arms are preferably not exactly parallel but slightly convergent toward their outer ends to compensate for a certain unavoidable amount of elastic deformation of the apparatus under the maximum possible pressure which may be developed by the pistons.

Figures 7 to 9, inclusive, show other forms of load carrying arms. The arm 31a shown in Figure 7 is provided with a perforated rubber pad 77 in its channel to prevent damage to the object being lifted. In this case the compression necessary to exert a firm grip on the object takes place in the rubber cushion 77 rather than in the object itself. The rubber cushion 77 may be mounted on a plate which is secured in the channel of the arm 31a by means of machine screws 78, or the like, in the flanges. In Figure 8 a steel plate 80 equipped with spikes 81 is secured in the arm 31b for use on materials that will not be damaged by the spikes.

The arm 31d in Figure 9 is designed for handling heavy, cylindrical objects such as oil drums and the like. The top and bottom flanges 76 are recessed in circular arcs 90 to fit the cylindrical shape of the object, the arc being located near the end of the arm to leave a relatively thin nose 91 at the end of the arm. The purpose of the thin nose 91 is to permit the arms to be driven forward between tightly packed oil drums and the like to remove any particular drum, or to place such oil drums closely together on the floor. Cylindrical containers such as oil drums are usually provided with one or more circumferential ridges or beads in the mid portion which serve to maintain a slight lateral spacing between the cylindrical parts of the drums when they are standing on end and which provide a ledge or shoulder to engage over one of the flanges 76 of the load carrying arm to reduce the compressive force required to be exerted by the arms to lift the drum. The present mechanism, using the arms 31d, is capable of picking up two full 55-gallon oil drums in side by side position without damaging the drums. The cylinder gripping device shown in Figure 9 may also be made as an attachment for the arms 31, but it is usually preferred to make the arms considerably shorter for this purpose. With some modification the arms of Figure 9 may be adapted to grip rolls of paper and other cylindrical objects.

Still other types of load carrying arms may be devised by persons skilled in the art for handling other kinds of materials, the various modifications illustrated in the drawings being sufficient to teach persons skilled in the art how to apply the principles of the invention to a wide variety of purposes. Also, conventional lifting forks may be bolted to the cross heads 44 if desired.

Figure 2:
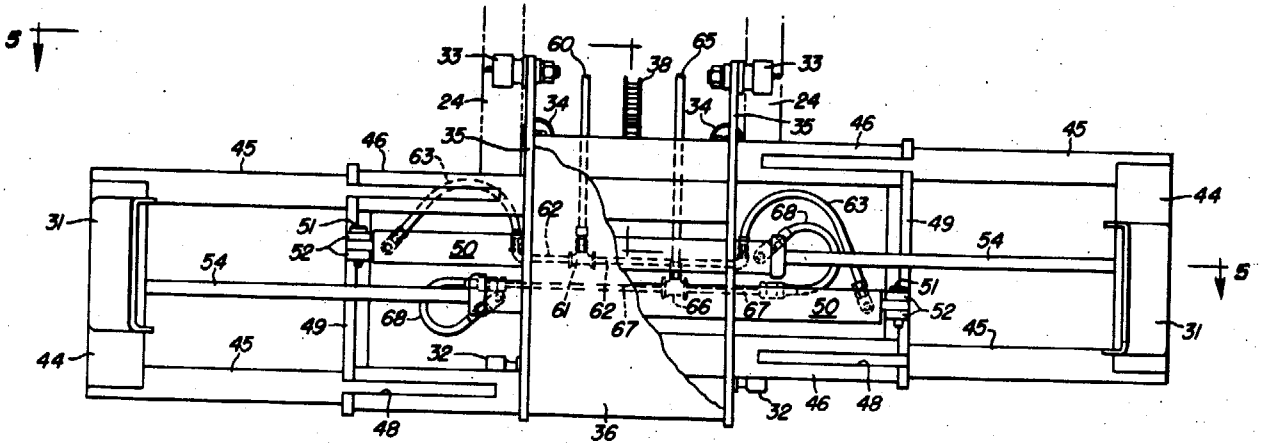
Figure 2 is a front elevation view of the load carriage of the lift truck with the load carrying arms fully extended.

It will be observed in Figures 1 and 2 that one of the arms 31 must be mounted lower on its plate 44 than the other arm because of the offset relation of the two pairs of guide tubes 46. With the arms 31 mounted as shown in Figures 1 and 2, they cannot be lowered quite to the floor level because of the thickness of the lowermost guide tube 46. Figure 10 shows a mounting arrangement for the arms 31 on extension brackets 93 to place them in a lower position so that they may be dropped down on the floor when necessary. Where this is not an essential requirement, the construction of Figure 2 is preferred so that the two arms will be disposed about equally above and below the two piston rods 54.

For handling fragile packages, the pressure in conduit 65 may be controlled by an auxiliary valve to positively limit the crushing force which may be exerted by the load-carrying arms. In Figure 11 this pressure regulating valve is indicated at 95 as a relief valve connected across the lines 60 and 65 in addition to the usual relief valve 96 ordinarily connected across the gear pump 25. A pressure gauge 97 in lieu of, or in addition to, the pressure regulating valve 95 may be used to indicate to the operator when the maximum safe force has been applied to the arms.

The low pressure relief valve 95 does not interfere with the action of the lift cylinder and other hydraulic devices which may require a high pressure, because when any of such devices are functioning the valve 40 is in its closed position to isolate the relief valve 95. When the valve 40 is in the position shown to clamp the arms 31, the valves for the lift cylinder and other hydraulic apparatus are then in closed position to isolate all such apparatus from the system so that it will not be affected by the reduction in pressure in the line 65. Ordinarily, the valve 40 would not be moved to either of its open positions while other hydraulic apparatus in the system was operating. In lieu of the relief valve 95, a pressure reducing valve may also be used for the same purpose, and still other refinements may be added to the system as will readily occur to persons skilled in the art. Figure 11 is a schematic representation of a part of the hydraulic system and is not intended to portray the true physical arrangement of the different elements.

Figures 12 and 13 illustrate a modified form of construction where the load clamping mechanism is mounted for rotation on the lift carriage. In this embodiment the guides 46 form an integral part of a frame having a back plate 100 mounted for rotation on the lift carriage 101. The plate 100 is supported on the carriage on a hollow bearing 102 having a central opening for the flexible hydraulic conduits 60 and 65. Suitable means forming no part of the present invention may be connected between the plate 100 and carriage 101 to rotate the plate and its clamping arms through an angle of substantially 180° in either direction from its normal upright position.

With the apparatus just described, a heavy object may be easily turned over, or an open barrel or box may be lifted and inverted to dump the contents therefrom. In Figure 12 the mechanism is shown erect in its lowermost position in full lines as it would be, for instance, in picking up a barrel of loose material. Then, by lifting the carriage 101 and rotating the plate 100, as indicated in broken lines, the barrel would be inverted and its contents dumped. In such construction the centering of the load by the metering action of the orifices 70 is important to obtain the necessary balance for easy rotation on the bearing 102.

Figure 14 shows a modified form of construction for the guides and slides for the clamping arms 31. The guides 46a are of tubular construction, having a rectangular cross section and provided at their outer ends with longitudinal slots 48 for the horizontal end portions 47 of the cross head members 44. The slides 45a in this case are also of rectangular cross section to have a smooth sliding fit in the guides 46a. Other equivalent and suitable forms of slides and guides will occur to persons skilled in the art.

In the various modifications and embodiments hereinabove described, a salient feature of the invention resides in the compact construction and arrangement of the guides and hydraulic cylinders for supporting and moving the load carrying arms in opposed reciprocating travel on the lift carriage *to form a load clamp*. The parallel overlapping disposition of the guides and cylinders in a common vertical plane accomplishes the objects of the invention in a novel and efficient manner and successfully overcomes the numerous shortcomings and limitations of prior apparatus for the same purpose. The parallel guides and cylinders form a flat assembly which does not project above or below a conventional lift truck load carriage and which has a thickness of only a few inches to be accommodated between the upright frame of the lift truck and the load. All pivotal connections are eliminated in the mounting of the load carrying arms which have rectilinear horizontal movement parallel with the floor. This arrangement of the operating parts greatly extends the range of movement of the arms, so that they are extendible from closely spaced positions to very widely spaced positions in continuous movement without any mechanical adjustments and with a uniform clamping force on the arms in all positions.

When the parts are proportioned as best illustrated in Fig. 2, it will be observed that the cylinders 50 each have a length approximately equal to three quarters of the width of the lift carriage, measured between the end plates 49, whereby each cylinder extends beyond the middle of the carriage and the two cylinders overlap for a considerable distance. Thus the load carrying arms 31 may be retracted to a minimum spacing of approximately half the width of the carriage, and extended to a maximum spacing approximately double the width of the carriage.

It will be apparent to persons skilled in the art that the principles of the invention are not limited to use on lift trucks or attachments for lift trucks, but that they may also be applied to other types of material handling apparatus within the scope of the appended claims.

Having now described my invention and in what manner the same may be used, what I claim as new and desire to protect by Letters Patent is:

1. In a lift truck, a lift carriage, a pair of load arms on opposite sides of the carriage rigidly mounted on the outer ends of oppositely directed elongated slides, horizontal guides on said lift carriage supporting said slides for extension and retraction of said arms laterally of the truck, and a pair of horizontal fluid pressure cylinder and piston rod units disposed one above the other in overlapping relation, each of said units being connected between one of said load arms and the opposite side of the carriage, said cylinders each having a length approximately equal to three quarters of the width of the carriage to draw said arms together to a minimum spacing approximately equal to half the carriage width and to extend said arms to a maximum spacing approximately equal to twice the carriage width.

2. In a lift truck, a lift carriage having two pairs of horizontal guides disposed in interjacent relation one above the other, a pair of load arms mounted on opposite sides of the carriage for sliding movement on the respective pairs of guides between a retracted position within the width of the carriage and an extended position beyond the width of the carriage, and a pair of horizontal fluid pressure cylinder and piston rod units disposed one above the other for moving the respective load arms between said retracted and extended positions, each of said units being connected between one of said load arms and the opposite side of the carriage.

3. In a lift truck, a lift carriage having two pairs of horizontal guides, each pair comprising upper and lower guides wherein the lower guide of one pair is disposed between the guides of the other pair and the upper guide of said other pair is disposed between the guides of said one pair, a pair of load arms mounted on opposite sides of the carriage for sliding movement on the respective pairs of guides between a retracted position within the width of the carriage and an extended position beyond the width of the carriage, and a pair of horizontal fluid pressure cylinder and piston rod units disposed one above the other for moving the respective load arms between said retracted and extended positions, each of said units being connected between one of said load arms and the opposite side of the carriage.

4. In a lift truck, a lift carriage having two pairs of horizontal guides disposed in interjacent relation one above the other, a pair of load arms mounted on opposite sides of the carriage for sliding movement on the respective pairs of guides between a retracted position within the width of the carriage and an extended position beyond the width of the carriage, and a pair of oppositely directed horizontal fluid pressure cylinders disposed one above the other, each cylinder having one end connected to one side of the carriage and a piston rod in its other end connected with the load arm on the opposite side of the carriage, and each cylinder having a length exceeding half the width of the carriage to impart a corresponding length of travel to each load arm.

5. In a lift truck, a lift carriage having two pairs of horizontal guides disposed in interjacent relation in a common vertical plane, a pair of load arms mounted on opposite sides of the carriage for sliding movement on said guides, a pair of oppositely directed horizontal fluid pressure cylinders disposed one above the other between said guides, each cylinder having one end connected to one side of the carriage and a piston rod in its other end connected with the load arm on the opposite side of the carriage, said cylinders extending more than half way across the carriage so that said other ends overlap each other in the center of the carriage, said load arms having an extended position beyond the opposite sides of the carriage and a retracted position intermediate the lengths of said cylinders near the center of the carriage, and a bumper guard plate covering said guides and cylinders in the center portion of the carriage.

6. In a lift truck, a lift carriage having two pairs of horizontal tubular guides disposed in a common vertical plane, longitudinal slots in said guides, a pair of slides in each pair of guides, offset cross heads on the respective pairs of slides arranged to travel in said slots on opposite sides of the carriage, load arms on said cross heads movable between a retracted position intermediate the lengths of the respective guides and an extended position beyond the ends of the guides on opposite sides of the carriage, a pair of horizontal fluid pressure cylinders disposed between said guides in said common plane, each cylinder being connected at one end to one side of the carriage and extending toward the opposite side of the carriage, each cylinder having a length greater than half the width of said carriage and less than the full width of the carriage, and piston rods extending from the other ends of said cylinders and connected with said cross heads.

7. In a lift truck, a lift carriage having two pairs of horizontal guides disposed in a common vertical plane, a pair of load arms mounted on opposite sides of the carriage for sliding movement on the respective pairs of guides between a retracted position within the width of the carriage and an extended position beyond the width of the carriage, a pair of fluid pressure cylinder and piston rod units disposed one above the other for moving the respective load arms between said retracted and extended positions, each of said units being connected between one of said load arms and the opposite side of the carriage, means to deliver fluid to said cylinders under pressure, and means to meter the fluid flow to each cylinder individually to tend to produce equal movements of the two load arms when said arms encounter unequal resistance to movement.

*8. A load clamp for a lift truck and the like comprising a frame assembly having vertically spaced upper and lower guide means, a pair of load arms each having slide members mounted on said upper and lower guide means for horizontal travel, the slide members on one of said load arms being offset from the slide members of the other load arm, said arms having an extended position beyond the width of said frame assembly and a retracted position within the width of said frame assembly, and horizontal cylinder and piston rod means anchored to said frame by a thrust connection and disposed in the space between said upper and lower guide means for operatively connected with said load arms for moving the load arms together and apart between said extended and retracted positions.*

*9. A load clamp for a lift truck and the like comprising a frame, two pairs of elongated parallel horizontal guides on said frame, each pair comprising vertically spaced upper and lower guides, the two lower guides being spaced from the two upper guides, two pairs of slides supported by the respective pairs of guides in offset relation, a pair of load arms, one arm being mounted on each of said pairs of slides, and horizontal cylinder and piston rod means anchored to said frame by a thrust connection and extending parallel with said guides in the space between the upper and lower guides of the two pairs and operatively connected with said load arms for moving the load arms together and apart between extended and retracted positions.*

*10. A load clamp for a lift truck and the like comprising a frame assembly having two sets of vertically spaced upper and lower guide means, a first pair of slide members mounted on said* upper and lower guide means for horizontal travel, a crosshead interconnecting said slide members, a load arm on said crosshead, a second pair of slide members mounted on said upper and lower guide means for horizontal travel in offset relation to said first pair of slide members, a crosshead interconnecting said second pair of slide members, a load arm on said last mentioned crosshead, said arms having an extended position beyond the width of said frame assembly and retracted position within the width of said frame assembly, and horizontal cylinder and piston rod means operatively connected with said arms for moving the arms together and apart between said extended and retracted position.

11. A load clamp for a lift truck and the like comprising a pair of load arms, upper and lower horizontal slide members supporting each arm, the lower slide members for the two arms being spaced from the upper slide members for the two arms and the slide members on one arm being offset from the slide members on the other arm, a frame assembly having guide means supporting said slide members for horizontal travel, and a pair of horizontal cylinder and piston rod units extending parallel with said slide members and disposed in side by side relation in the space between said lower and upper slide members, each unit being connected between said frame assembly and one of said load arms, respectively, for moving said arms toward and away from each other in a long range of movement between extended and retracted positions.

12. A load clamp for a lift truck and the like comprising a first pair of vertically spaced upper and lower horizontal slide members, a crosshead interconnecting said slide members, a second pair of vertically spaced upper and lower horizontal slide members, a crosshead interconnecting said second pair of slide members, load arms mounted on said crossheads, a frame assembly having guide means supporting said two pairs of slide members in offset relation for horizontal travel, and a pair of horizontal cylinder and piston rod units, each unit being connected between said frame assembly and one of said load arms, respectively, for moving said load arms toward and away from each other between extended and retracted positions, said units being disposed in parallel side by side relation in the space between said lower and upper slide members to produce a long range of movement of said arms.

13. A load clamp for a lift truck and the like comprising a frame assembly, a pair of load arms mounted on said frame assembly for horizontal sliding movement toward and away from each other, and a pair of oppositely directed horizontal cylinder and piston rod units one above the other, each unit being connected between said frame assembly and one of said load arms, respectively, for moving said arms between an open position beyond the width of the frame assembly and a closed position within the width of the frame assembly, said units being disposed in parallel overlapping relation to produce a long range of movement of said arms.

14. A load clamp for a lift truck and the like comprising a frame assembly, a pair of load arms mounted on a plurality of guides on said frame assembly one above another for horizontal sliding movement toward and away from each other, a pair of oppositely directed horizontal cylinders, one above another, connected with said frame assembly, and piston rods in said cylinders connected with said respective load arms for moving said arms between extended and retracted positions, said cylinders being disposed in parallel overlapping relation to produce a long range of movement of said arms, the spacing of said arms in extended position being greater than their spacing in retracted position by a distance exceeding the over-all length occupied by the two cylinders in the frame assembly.

15. A load clamp for a lift truck and the like comprising a frame assembly having two pairs of elongated parallel horizontal guide members, each pair comprising vertically spaced upper and lower guide members, the two lower guide members being spaced below the two upper guide members, two pairs of slide members supported by the respective pairs of guide members in offset relation, a pair of load arms, one arm being mounted on each of said pairs of slide members, respectively, and a pair of horizontal cylinder and piston rod units, each unit being connected between said frame assembly and one of said load arms, respectively, for moving said arms toward and away from each other between extended and retracted positions, said units being disposed in parallel side by side relation in the space between said upper and lower guide members to produce a long range of movement of said arms.

16. A material handling device adapted to be mounted on a truck, comprising a carriage having a predetermined width, a pair of material handling arms mounted on said carriage for reciprocating movement toward and away from each other, said arms being adapted to engage a load of material therebetween, means mounting said arms comprising a pair of elongated slides, one for each arm, respectively, and each rigidly attached to its associated arm at the end thereof, and a pair of guide bearings, one for each slide, for supporting the same in all positions of reciprocating travel, said guides being fixedly mounted in horizontal position on said carriage and disposed entirely within the confines of the predetermined width thereof, each slide being of sufficient length to support its attached arm in extended position and when in extended position said arms having space therebetween equal to approximately twice said predetermined width of said carriage, said guides and associated slides being constructed and disposed to permit said arms to approach each other to a retracted position in which a space is provided between said arms equal to approximately one-half of said predetermined width of said carriage, and a pair of horizontal fluid pressure cylinder and piston rod units disposed one above the other in overlapping relation, one for each of said arm and slide assemblies, respectively, each unit being connected between its associated arm and slide assembly and said carriage and being capable of moving said arms, respectively, to full extended and retracted positions.

17. In an industrial truck having a lift carriage mounted for vertical movement, said carriage having a predetermined width transversely of the truck, a pair of load arms adapted to engage a load of material therebetween, upper and lower horizontal slide members supporting each arm, the lower slide members for the two arms being spaced below the upper slide members for the two arms and the slide members on one arm being offset from the slide members of the other arm, guide means on said carriage supporting said slide members for transverse horizontal travel, and a pair of horizontal cylinder and piston rod units disposed in side by side relation par-

*allel with said slide members in the space between said lower and upper slide members, each unit being connected between said carriage and one of said load arms, respectively, for moving said arms toward and away from each other between an extended position beyond said width of the carriage and a retracted position within the width of the carriage.*

*18. A load clamp for a lift truck and the like comprising a pair of load arms mounted on the outer ends of oppositely directed horizontal slides for reciprocating horizontal travel toward and away from each other to clamp a load therebetween, a frame assembly having guides supporting said slides through a range of travel between extended and retracted positions, said arms in extended position being spaced apart a distance approximately twice the width of said frame assembly and in retracted position being spaced apart a distance approximately half the width of said frame assembly, and a pair of overlapping horizontal cylinder and piston rod units, one above the other, each connected between said frame assembly and one of said arms, respectively, for moving said arms between said extended and retracted positions.*

*19. A load clamp for a lift truck and the like comprising a supporting frame of predetermined width, a pair of load clamping arms on opposite sides of said frame, elongated horizontal guide means, respectively, one above another on said frame supporting said arms for sliding movement between an extended position beyond the width of said frame and a retracted position within the width of said frame, and a pair of horizontal cylinder and piston rod units disposed one above the other for moving said load arms between said extended and retracted positions, each of said units being connected between one of said load arms and the opposite side of the frame.*

*20. A load clamp for a lift truck and the like comprising a supporting frame of predetermined width, a pair of load clamping arms on opposite sides of said frame, a pair of horizontal cylinder and piston rod units disposed one above the other for moving said load arms in sliding movement between an extended position beyond the width of said frame and a retracted position within the width of said frame, each of said units being connected between one of said load arms and said frame, and elongated horizontal guide means on said frame supporting said arms for said sliding movement, the guide means for the two arms being relatively offset one above the other and symmetrically disposed about the axes of said cylinder and piston rod units.*

LESLIE G. EHMANN.

References Cited in the file of this patent or the original patent

UNITED STATES PATENTS

| Number | Name | Date |
|---|---|---|
| 1,518,561 | Carroll | Dec. 9, 1924 |
| 1,878,994 | Abbe | Sept. 27, 1932 |
| 1,895,640 | Norling | Jan. 31, 1933 |
| 1,909,813 | Crosbie | May 16, 1933 |
| 2,178,369 | Dunham | Oct. 31, 1939 |
| 2,281,004 | Lehmann et al. | Apr. 28, 1942 |
| 2,292,605 | Brase | Aug. 11, 1942 |
| 2,403,356 | Francis | July 2, 1946 |
| 2,412,845 | Stevens | Dec. 17, 1946 |
| 2,420,828 | King | May 20, 1947 |
| 2,432,411 | Guerin et al. | Dec. 9, 1947 |
| 2,475,367 | Avery | July 5, 1949 |
| 2,497,118 | Ferrario et al. | Feb. 14, 1950 |
| 2,512,409 | Adde | June 20, 1950 |
| 2,611,497 | Backofen | Sept. 23, 1952 |
| 2,613,830 | Ponnequin | Oct. 14, 1952 |